J. D. Parrot,
Churn Power.
Nº 39,827. Patented Sep. 8. 1863.
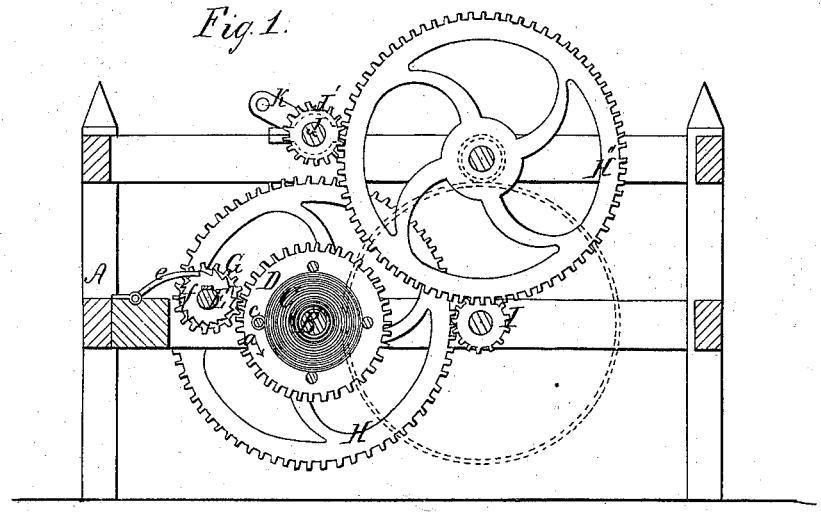
Fig. 1.
Fig. 3.
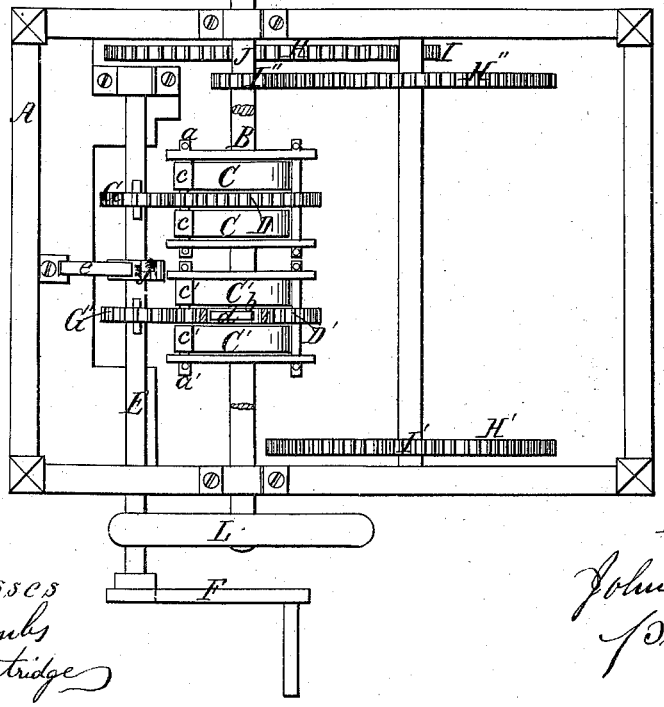
Fig. 2.
Witnesses
J W Coombs
M S Partridge
Inventor
John D Parrot
per Munn & Co
attorneys

United States Patent Office.

JOHN D. PARROT, OF MORRISTOWN, NEW JERSEY.

IMPROVEMENT IN CHURN-POWERS.

Specification forming part of Letters Patent No. 39,827, dated September 8, 1863.

*To all whom it may concern:*

Be it known that I, JOHN D. PARROT, of Morristown, in the county of Morris and State of New Jersey, have invented a new and Improved Churn-Power; and I do hereby declare that the following is a full, clear, and exact description of the same, reference being had to the accompanying drawings, forming a part of this specification, in which—

Figure 1 represents a longitudinal vertical section of my invention. Fig. 2 is a plan or top view of the same. Fig. 3 is a detached sectional view of one of the wheels.

Similar letters of reference indicate corresponding parts in the three figures.

The object of this invention is to combine two or more springs with a series of pinions and cog-wheels and with a crank-shaft in such a manner that either one or more springs can be wound up and made to impart a rotary motion to said crank-shaft, and that by the action of the crank on said shaft the dasher of a churn or any other small machine can be operated with any desired power as long as may be required to accomplish a certain amount of work.

To enable those skilled in the art to make and use my invention, I will proceed to describe it.

A represents a frame, made of timber or any other suitable material, and sufficiently strong to support the working parts of my power. This frame forms the bearings for the shaft B, to which two or more springs, C C', are secured with their inner ends by means of pins, or in any other suitable manner. The outer ends of said springs are connected by means of loops c c' to pins a a', which pass transversely through cog-wheels D D', so that by rotating one of said cog-wheels in the direction of the arrow marked on it in Fig. 1 the springs connected to it are wound up. It will be noticed that the springs are connected to each of the wheels D D', in order to equalize the strain on the wheels and for the sake of greater convenience in the manufacture of the springs and of the whole mechanism. The wheels D D' are placed loosely on the shaft B, and they rotate on ratchet-wheels b, Fig. 2, which are placed in their center, and which are firmly connected to the shaft. Pawls d allow the wheels to rotate independent of the shaft in the direction of the arrow marked on one of them in Fig. 1; but in moving in the direction opposite to said arrow the pawls d engage with the teeth of the ratchet wheels b, and the shaft is prevented from rotating in the opposite direction. The springs C C' are wound up by means of a shaft, E, bearing a winch, F, and two pinions, G G', which are secured to the shaft by means of keys in such a manner that they can be readily thrown in or out of gear with the wheels D D'. If one of the pinions, G, is thrown in gear with the wheel D, the springs C alone are wound up and the springs C' remain inactive; but if both pinions G G' are thrown in gear all the springs are wound up simultaneously. It is obvious that a still larger number of springs might be arranged on the shaft B, if it should be desirable to increase the power. The shaft E is prevented from rotating in the wrong direction by a pawl, e, gearing into a ratchet-wheel, f, which is firmly keyed to said shaft. The motion of the shaft B is transmitted by cog-wheels H H' H'' and pinions I I' I'' to the crank-shaft J, and the crank K at the end of this shaft connects with the dasher or working part of the churn or with any other small machine to which it is desired to impart motion. A balance-wheel, L, on the shaft J serves to equalize the motion. By this arrangement any desired amount of power can be employed for the purpose of operating a churn or other machine. One or more springs can be brought in action whenever it is desired, and either of the springs can be wound up during the operation without interrupting the motion of the power.

What I claim as new, and desire to secure by Letters Patent, is—

The arrangement of two or more springs, C C', on the same shaft, B, in combination with the cog-wheels D D' and pins a a' and with the adjustable pinions G G' on the shaft E, constructed and operating in the manner and for the purpose substantially as shown and described.

JOHN D. PARROT.

Witnesses:
 J. V. D. CRAFT,
 SYLVESTER FORCE.